Patented July 20, 1948

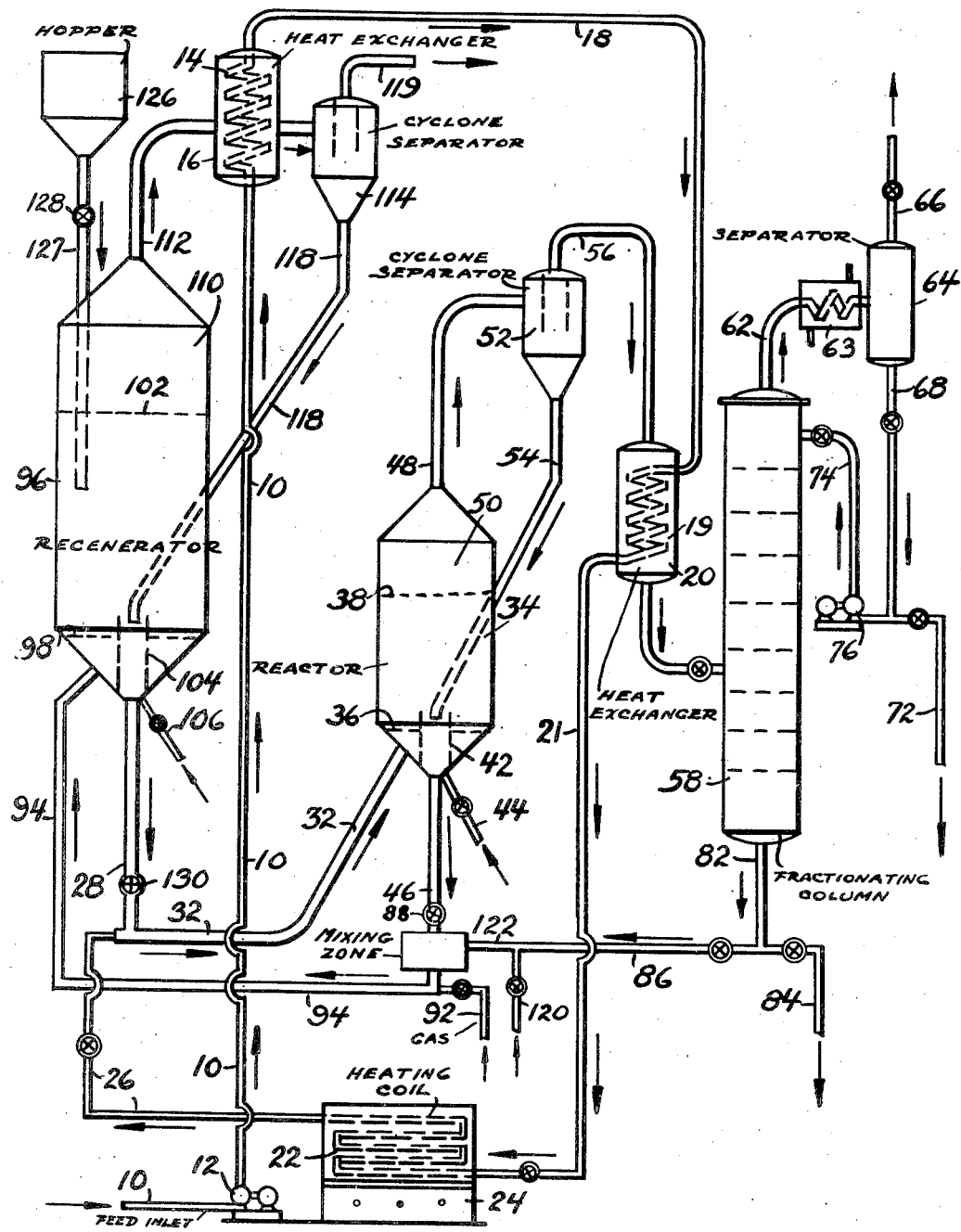

2,445,351

UNITED STATES PATENT OFFICE 2,445,351

PROCESS OF ADDING HEAT IN THE REGENERATION OF CATALYST FOR THE CONVERSION OF HYDROCARBONS

Edwin J. Gohr, Summit, N. J., assignor to Standard Oil Development Company, a corporation of Delaware Application December 27, 1941, Serial No. 424,603

3 Claims. (Cl. 196—52)

This invention relates to catalytic reactions and more particularly relates to catalytic reactions resulting in the production of improved motor fuels.

In many of the processes in which finely divided or powdered catalyst is used the operation is carried out in two stages. In one stage a hydrocarbon vapor or gas is treated with solid catalyst particles and this is followed by a second stage in which the contaminated deposit on the catalyst particles is removed by burning.

For example, in the catalytic conversion of hydrocarbons, carbonaceous material is deposited on the catalyst particles. The carbonaceous material is coke-like material containing carbon and hydrogen in varying proportions. One of the difficulties in the design of large scale equipment for a variety of feed stocks for processes of this nature is that it is almost impossible to predict exactly the amount of catalyst deposit which has to be removed by regeneration. Even in certain special cases where the amount of catalyst deposit is predictable, the large scale plants must be built to operate with varying amounts and different kinds of feed stocks. This flexibility requires that the plant be able to handle a rather large range of quantity of catalyst deposit.

Plants designed with such flexibility are quite costly. In these plants the heat of regeneration is preferably removed and the heat exchanger or exchangers through which the heat of regeneration is removed must be designed for the maximum quantity of coke deposit but must also operate satisfactorily when the carbonaceous deposit is small. Other equipment associated with the heat exchanger or exchangers must consequently also be made to conform to maximum coke-burning capacity. Furnaces, on the other hand, must be designed to take care of conditions of minimum coke.

For example, the heat of regeneration, or a portion thereof, is used to heat the incoming feed stock to a certain temperature and then the preheated feed stock is further heated and vaporized in a vaporizer furnace. The vaporizer furnace must be made large enough to preheat the feed in the cases where only a small amount of carbonaceous deposit is formed. Where the heat of regeneration is used to make steam directly, there will be a large variation in the possible steam production due to the variation in the carbonaceous deposit, and extra expense will be involved in compensating for such variations.

According to this invention, the carbonaceous deposit or combustible material on the catalyst particles or on the catalyst may be maintained at a reasonably constant value so that a steady amount of heat will be given up by the regeneration. In this way all the equipment associated with the plant for a given duty can be estimated in advance of plant operation. More specifically, according to this invention a rather heavy but fairly clean petroleum fraction essentially free of inorganic solids or of such a concentration that no build up occurs on catalyst is added to the catalyst particles entering the regeneration zone in such an amount as to increase the heat obtained during regeneration to a predetermined design value. This hydrocarbon fraction may be added to the catalyst or catalyst particles by injecting the oil into a chamber or mixing zone where it is mixed with the powdered catalyst or other catalyst going to the regeneration zone. In another form of the invention condensate oil from the fractionating zone containing entrained catalyst particles may be used as the oil to be added to the catalyst particles going to the regeneration zone. By mixing the oil with the catalyst particles the oil is distributed on the catalyst particles and local overheating is avoided.

My invention is especially adapted for hydroforming of naphthas or dehydrogenation of hydrocarbons as in these processes the reaction is highly endothermic and the coke deposition is relatively small.

In the drawing the figure represents one form of apparatus which may be used for carrying out my invention, but it is to be understood that other forms of apparatus may be used.

Referring now to the drawing, the reference character 10 designates a line through which the feed stock is passed by means of pump 12. The feed stock is passed through a preheating coil 14 in heat exchanger 16 where it indirectly contacts hot regeneration gases, as will be hereinafter described in greater detail. The preheated feed stock is withdrawn from the heat exchanger 16 through line 18 and is passed through another heating coil 19 in heat exchanger 20 where it indirectly contacts hot reaction products in vapor form as will be hereinafter described in greater detail. The preheated feed stock may then be passed through line 21 and then through a heating coil 22 or the like in furnace 24 for further heating. Feed stock may be vaporized or not.

The vaporized or heated feed stock is mixed with powdered catalyst or finely divided catalyst introduced into line 32 from standpipe 28. The finely divided catalyst particles are hot regenerated catalyst particles withdrawn from a regeneration zone, later to be described in greater detail.

The mixture of finely divided catalyst particles and vaporized feed stock is passed through line 32 and introduced into the bottom portion of a reaction zone 34 below a perforated distribution plate 36 therein. The velocity of the vapors is maintained at such a figure that the catalyst particles are maintained in fluidized condition and assume the level shown at 38. While the level 38 is shown in one position, it may be varied and may be higher or lower. The level 38 is not a quiescent level but more nearly assumes the appearance of a violently boiling liquid.

In the reaction zone 34 the catalyst particles are maintained in a turbulent condition so that the temperature throughout the reaction zone is substantially uniform and the hydrocarbon feed stock is converted to lower boiling hydrocarbons. During the conversion operation a quantity of carbonaceous material, commensurate with satisfactory conversions to lighter material, is deposited on the catalyst particles and before they are used again in another conversion operation they must be regenerated. The catalyst particles in the reaction zone 34 are maintained in a relatively dense fluidized condition and the catalyst particles to be regenerated are preferably withdrawn from the body of the fluidized catalyst in the reaction zone.

For this purpose a well 42 is provided in the lower portion of the reaction zone 34 from which the contaminated catalyst particles are withdrawn. It will be noted that the upper portion of the well 42 extends above the distribution plate 36 and that the oil or feed stock inlet 32 introduces the feed stock at one side of the well 42. The contaminated or spent catalyst in the well 42 may be stripped of at least a portion of the volatile hydrocarbons by the introduction of a stripping gas, such as steam, into the bottom portion of the well 42 through line 44. The contaminated catalyst particles in fluidized condition flow into standpipe 46 connected to the bottom portion of the well 42 and are passed to a regeneration zone, hereinafter to be described in greater detail.

The products of conversion in vapor form leave the top of the reaction zone 34 through line 48. The space 50 above the level 38 in the reaction zone forms a settling zone so that the vaporous products of reaction going overhead through line 48 are substantially free of solid catalyst particles, but they do entrain a certain amount of the finely divided catalyst particles.

The vaporous reaction products may be passed to a separating zone 52 which is shown in the drawing as a cyclone separator for separating vaporous products of reaction from a large part of the entrained solid particles. The separation is a dry one and no liquid constituents are present. More than one cyclone separator may be used if desired. In another form of apparatus the space or chamber 50 above the level 38 in the reaction zone 34 may be enlarged to form additional settling space, and in this case the cyclone separator or other separating means 52 may be eliminated.

The separated solid particles fall downward in the cyclone separator or separating means 52 and are withdrawn therefrom by line 54 which preferably returns the solid particles to the well 42. If desired, these separated solid particles may be returned to the body of the fluidized catalyst particles above the well 42.

The separated hot reaction products in vapor form and entrained solid particles pass overhead from the separating means 52 through line 56 and heat exchanger 20 and are introduced into the lower portion of a fractionating tower 58 wherein the vapors are fractionated to separate condensate oil from the desired motor fuel. In the heat exchanger 20 the hot reaction products have their temperature reduced so that suitable temperatures are maintained in the fractionating tower 58. The fractionated vapors and gases pass overhead through line 62 and through condenser 63 and are introduced into a separator 64 for separating gases from liquids. The gases pass overhead through valved line 66 and the desired motor fuel liquid is withdrawn from the bottom of the separator 64. A portion of the motor fuel liquid is withdrawn through valved line 72. Preferably another portion of the liquid is returned through line 74 by pump 76 to the upper portion of the fractionating tower 58 as reflux.

The vaporous reaction products introduced into the fractionating tower 58 are further cooled and the heavier constituents are condensed. During condensation the entrained catalyst particles are washed out of the vapors and the condensate oil which is withdrawn from the bottom of the fractionating tower 58 through line 82 contains the catalyst particles which are washed out of the vapors. A portion of the condensate oil which comprises a slurry is withdrawn through line 84 and may be withdrawn from the process or may be recycled to the reaction zone. Preferably, a portion of the condensate oil containing the catalyst particles scrubbed out of the reaction product is passed through line 86 and mixed with the stream of contaminated catalyst particles going to the regeneration zone, as will be hereinafter described in greater detail.

Returning now to the contaminated catalyst particles which are to be regenerated, the contaminated particles from the standpipe 46 are passed through valve 88 and mixed with a regenerating gas, such as air or other oxygen-containing gas, introduced through line 92. The mixture of contaminated catalyst particles and regenerating gas is passed through line 94 and introduced into the bottom portion of a regeneration zone 96 below the perforated distribution plate 98 therein. In the regeneration zone the velocity of the gases is selected so that the catalyst particles undergoing regeneration are maintained in a fluidized conditon and in a relatively dense condition.

Under these conditions the catalyst particles undergoing regeneration have a level indicated at 102. The level 102 may be higher or lower than that shown in the drawing. The level is not a quiescent one but assumes the appearance of a violently boiling liquid. During regeneration the catalyst particles are maintained in a turbulent condition and in this way the temperature during regeneration is maintained substantially uniform throughout the fluidized mixture.

The regeneration zone 96 is provided with a draw-off well 104 provided in the bottom portion of the regeneration zone. The hot regenerated catalyst particles flow into the well 104 from which they are withdrawn and flow into the standpipe 28, hereinbefore described. It should be noted that the upper portion of the well 104 extends above the distribution plate 98 and that the mixture of contaminated catalyst particles and regenerating gas is introduced into the regeneration zone 96 at one side and exterior to the well 104. Stripping gas, such as steam, may be introduced into the bottom portion of the well 104 through line 106 to remove entrained oxygen-containing gas from the regenerated catalyst particles.

The regeneration zone 96 is provided with a settling zone or chamber 110 above level 102 in the regeneration zone and this forms a settling space for removing a large portion of the regenerated catalyst particles from the regeneration gases leaving the body of the fluidized mixture. The regeneration gases pass overhead through line 112 and heat exchanger 16 and as they still contain a certain amount of catalyst particles they are introduced into a separating zone 114. In the drawing this separating zone is shown as a cyclone separator, but other separating means may be used. If desired, the separating chamber or zone 110 may be enlarged to effect a better separation of catalyst particles from the regeneration gases and in this case the separating means 114 may be eliminated.

In the separating means 114 most of the entrained solid particles are removed from the regeneration gases and are removed from the bottom of the separating means through line 118. As shown in the drawing, the line 118 returns the separated catalyst preferably to the well 104, but, if desired, the separated catalyst particles may be returned to the fluidized mixture above the well 104. The separated regeneration gases leave the top of the separating means 114 through line 119. If desired, further separating means may be provided, such as a Cottrell precipitator, for removing substantially all of the remaining solid particles in the regeneration gases.

With certain feed stocks and under certain conversion conditions the amount of carbonaceous material deposited on the catalyst may be predicted fairly accurately. However, it is usually desirable to build a plant which may be used for operating on different feed stocks and according to my invention it is preferred to make the equipment large enough to take care of burning the maximum amount of carbonaceous material deposited on the catalyst particles. The saving is in the size of the vaporizer furnace.

As described above, it is preferably to partly preheat the feed stock by indirectly contacting it with hot regeneration gases in the heat exchanger 16 and then vaporizing the preheated feed stock in the vaporizer furnace 24. Where the feed stock gives a low carbonaceous deposit on the catalyst particles, the heat produced by the regeneration gases will not be sufficient to supply the preheat for the feed stock to the desired extent, the temperature of the regenerated catalyst particles will be lower and a larger vaporizer furnace will be necessary.

In order to overcome the objections above described, I provide means for adding combustible material or carbonaceous material to the contaminated catalyst stream going to the regeneration zone 96 in cases where insufficient carbonaceous material is deposited on the catalyst particles during conversion in the reaction zone 34. A rather heavy but fairly clean petroleum fraction is introduced through line 120 and passed through line 122 for admixture with the contaminated catalyst introduced through line 94 from the standpipe 46 communicating with the well 42 in the reaction zone 34. Examples of the oil introduced through line 120 are kerosene, gas oil, tars, lubricating oil residuums, etc. Oils are preferred as they have lower ignition temperatures than the low molecular weight hydrocarbons such as methane. Hydrocarbon fractions having an ignition temperature below the regeneration temperature are preferred.

Preferably, the oil is sprayed or atomized into the catalyst-carrying line so that the oil is substantially evenly distributed on all of the catalyst particles. In cases where the introduced oil is relatively light, it will be substantially vaporized on contacting the hot contaminating catalyst particles and will be mainly burned as a vapor in the regeneration zone 96 during regeneration of the contaminated catalyst particles. However, where the introduced oil is relatively heavy such as a residual oil, it will be at least partly cracked and carbonaceous material deposited on the contaminated catalyst particles. During such cracking some vaporizable hydrocarbons are formed which will be mainly burned in the regeneration zone 96 during regeneration of the contaminated catalyst particles. As shown in the drawing, instead of using oil from an external source the condensate oil or bottoms from the fractionating tower 58 is passed through lines 86 and 122 for injection into the stream of contaminated catalyst going to the regeneration zone. In this way the condensate oil from the fractionating tower 58 is used to recover at least a portion of the entrained catalyst from the reaction products and is also used to supply additional heat during regeneration. Or, both such condensate oil and oil from an external source may be used.

The oil to be used for supplying additional heat during regeneration of the catalyst particles is preferably a low grade inexpensive oil. This oil to be added may be introduced in other ways than that shown in the drawing. For example, the oil may be mixed with fresh catalyst particles being added to the plant to replace catalyst lost during the operation of the process. If the oil is added in vapor form, it is mixed with the catalyst particles and the mixture cooled to condense the oil and to obtain a substantially dry mixture with the oil evenly distributed throughout the catalyst. If the oil is added in liquid form, it is mixed with the catalyst to form a substantially dry mixture.

As shown in the drawing, hopper 126 is provided for introducing fresh catalyst to the plant. Preferably the fresh catalyst is introduced into the regeneration zone 96 through line 127 provided with a control valve 128. Preferably the line 127 extends below the level 102 of the fluidized mass in the regeneration zone 96. The oil which is to be added to supply heat during regeneration of the catalyst particles is preferably added to the fresh catalyst in the hopper 126 in any suitable manner, as for example, in any of the ways above described.

As shown in the drawing, the regeneration zone 96 is positioned at a higher level than the reaction zone 34. With this arrangement the reaction zone 34 is under a slight superatmospheric pressure of about 6 to 8 pounds per square inch gauge, so that the vapors leaving the reaction zone 34 through line 48 are under a sufficient pressure to force them through the fractionating equipment. The regeneration zone is preferably at about atmospheric pressure. If the catalyst particles are maintained in fluidized condition, sufficient pressure is produced to carry the catalyst particles from the regeneration zone to the reaction zone and for carrying the contaminated catalyst particles from the reaction zone to the regeneration zone. The pressure produced by the fluidized mixture in the regeneration zone 96 and the pressure produced by the height of the standpipe 28 are sufficient to force the lighter or less dense suspension in line 32 into the reaction zone 34. With the reaction zone under pressure, the height of fluidized particles in standpipe 46 is less than the height of standpipe 28 for returning the contaminated catalyst particles as a lighter or less dense suspension through line 94 to the bottom portion of the renegeration zone 96.

The standpipe 28 is provided with a control valve 130 for controlling the amount of regenerated catalyst particles being introduced into the vaporized feed stock to be converted. While in the drawing the regeneration zone 96 is shown above the reaction zone 34, it is to be understood that the two may be at the same level or the reaction zone may be arranged at a higher level than the regeneration zone. In the last case the regeneration zone will be under a greater pressure than the reaction zone.

As a specific example the catalytic cracking of relatively heavy hydrocarbon oil, such as gas oil or reduced crude or the like, will be described. An East Texas gas oil having a 31.5° A. P. I. gravity and a middle boiling point of about 700° F. is passed through the heat exchangers 16 and 20 where its temperature is raised to about 550° F. to 600° F. From here the gas oil is passed through the vaporizer furnace 24 where its temperature is raised to about 650° F. to 700° F.

The catalyst to be used may be any suitable cracking catalyst, such as acid activated bentonite clay, synthetic gels containing silica and alumina or silica and magnesia, or the like. Preferably, the catalyst is in powdered form between about 200 to 400 standard mesh or finer. For the catalytic cracking of gas oil a catalyst to oil ratio of about 6:1 by weight is used. The catalyst used is preferably acid treated bentonite clay. The hot regenerated catalyst is at a temperature of about 1050° F. before it is mixed with the gas oil vapors.

The velocity of the gas oil vapors passed through the reaction zone 34 is about 1.5 feet per second so as to maintain a relatively dense fluidized mixture of catalyst particles. During conversion the average temperature is about 900° F. The velocity of the gas oil vapors may vary from about 0.5 to 3.0 or more feet per second.

As a regenerating gas, air is preferably mixed with the contaminated catalyst particles and the velocity of the regenerating gas is about 1.2 feet per second to maintain a fluidized mixture having a relatively high density in the regeneration zone 96. The temperature during regeneration is maintained at about 1050° F. The velocity of the regenerating gas may vary from about 0.5 to 3.0 or more feet per second.

In the reaction zone the density of the fluidized mixture is about 17 pounds per cubic foot and the density of the fluidized mixture in the regeneration zone is about 15 pounds per cubic foot.

When the gas oil chosen is cracked to obtain about 45% conversion, about 3% carbonaceous material or coke-like substance is formed which is deposited on the catalyst particles. Since this corresponds to the maximum amount of heat liberation in the regenerator, the vaporizer furnace, following exchangers 16 and 20, can be designed for minimum duty which would be impossible if the heat liberation in the regenerator could not be maintained at its maximum value. If the feed stock is now switched to another type which yields only 1.5% coke, that is, where only 1.5% of the feed stock is converted to coke-like deposits, and with the same amount of catalyst in the regeneration and reaction zones, the temperature of regeneration will be lower and the burning rate will be lower and the process will not operate to give the desired results as will be seen from the following.

For example, if for a feed stock producing 3% coke at 850° F. the regeneration is conducted at a temperature of 1150° F. (rather than 1050), the substitution of a feed stock producing only 1.5% coke will result in a regeneration temperature of only 1000° F. at the same catalyst circulation rate. At this temperature level the rate of combustion of carbonaceous material is less than one-half that at 1150° F. and so the amount of coke burned will be inadequate to reactivate the catalyst. As a result, the general conversion level in the reaction zone falls to a reduced value which in effect reduces the capacity of the entire plant, whereas, by the practice of my invention, the temperature in the regeneration zone can be maintained at a level such that the necessary amount of carbonaceous material is burned to provide the proper degree of reactivation as well as providing the necessary heat for conversion by supplying catalyst to the reactor at the desired temperature level. The regeneration temperature of 1150° F. was chosen rather than 1050° F. to more clearly indicate the application of my invention.

According to my invention the equivalent of the other 1.5% coke is added by introducing suitable hydrocarbon oil to the catalyst undergoing regeneration. In this way, the burning rate is made commensurate with the conversion desired. For example, to supply the equivalent of the additional 1.5% coke when using 42° A. P. I. kerosene, about 1.3 pounds of kerosene are used per 100 pounds of oil feed.

As above described, a low grade, inexpensive oil is injected and mixed with the contaminated catalyst particles going to the regeneration zone through line 94. This oil may be added from an external source through line 120 or may comprise at least a part of the condensate oil withdrawn from the bottom of fractionating tower 58 and passing through line 86. By maintaining the amount of heat supplied on regeneration substantially constant, the amount of preheat added to the feed stock remains substantially constant, the catalyst particles are heated to substantially the same temperature and the vaporizer furnace 24 is designed for its minimum size which would not be possible if compensation were not made for the lower coke-like deposit obtained by treating the low coke-forming stock.

The motor fuel withdrawn through line 72 forms a high grade, high octane gasoline which may be further treated as desired to produce the finished product.

While the invention has been particularly described in connection with catalytic cracking, it may also be used in other catalytic reactions, such as hydroforming of hydrocarbons, bauxite treating of hydrocarbons and other reactions in which a deposit is formed on the catalyst particles which must be removed by burning. In hydroforming some heat is supplied in the oxidation of the catalyst during regeneration and some heat is supplied during hydroforming by heat of catalyst reduction so that in this reaction less oil may be added to the catalyst going to the regeneration zone in the practice of my invention.

With this invention the heat realized during regeneration is adjusted to compensate for any variations in the carbonaceous deposit on the catalyst particles, and the invention is particularly applicable in processes where a large amount of heat is absorbed in the main reaction, such as in the conversion of hydrocarbons. For instance, in hydroforming or butane or other hydrocarbon dehydrogenation the heat of reaction is negative and quite large, whereas the coke deposition, and consequently the heat of regeneration, is relatively small. In these reactions it is desirable to have greater heat release in the regeneration so as to supply most of the heat for the reaction. This can be done according to my invention by supplying oil to the spent or freshly added catalyst so that additional heat above that obtained from the burning of the coke deposit is obtained during regeneration.

Instead of using the form of the apparatus shown in the drawing with bottom draw-off of catalyst from the reaction zones, the catalyst may be taken overhead as a suspension from these zones and then separated from the suspending gases or vapors. Instead of using standpipes as a means for developing pressure, other means, such as screw feeds, or the like, may be used. In addition to screw feeds above mentioned, lock hoppers and star feeders may be used. The heat exchanger 20 shown in line 56 may be transferred to line 82 to cool the withdrawn condensate oil and at least part of the cooled condensate recycled to the bottom of fractionating tower above the point of introduction of vapors through line 56 to cool the introduced vapors.

In cases where the carbonaceous deposit goes above the design limits, a heat exchanger for cooling regenerated catalyst may be used and the heat of regeneration removed for producing steam.

If higher regeneration temperatures up to about 1150° F. are used, a smaller vaporizer furnace 24 may be used. Where the temperature in the reaction zone is lower than that given in the specific example and higher regeneration temperatures and higher ratios of catalyst to oil are used, the vaporizer furnace may be entirely omitted and the hot regenerated catalyst is used to supply the heat necessary for the reaction. Any decrease in the carbonaceous deposit on the catalyst particles during reaction is compensated for by using my invention and adding combustible carbonaceous material to the regeneration zone.

While one form of apparatus has been shown and one specific example including specific conditions has been given of my invention, it is to be understood that these are by way of illustration only and variations and modifications may be made without departing from the spirit of my invention.

I claim:

1. A process of converting higher boiling hydrocarbons to lower boiling hydrocarbons which comprises vaporizing the higher boiling hydrocarbons and mixing them with catalyst particles, passing the mixture to a reaction zone wherein the higher boiling hydrocarbons are converted to lower boiling hydrocarbons and carbonaceous material is deposited on the catalyst particles, passing vaporous products of reaction containing entrained catalyst particles overhead from said reaction zone to a fractionating zone wherein higher boiling hydrocarbons are condensed and entrained catalyst particles are scrubbed out of the vapors by condensate oil and lower boiling hydrocarbons pass overhead from said fractionating zone, withdrawing contaminated catalyst particles from the bottom portion of said reaction zone as a dense fluidized mixture, mixing at least a portion of the condensate oil with the withdrawn contaminated catalyst particles, passing the mixture to a regeneration zone wherein deposited carbonaceous material and condensate oil are burned, and mixing hot regenerated catalyst with said higher boiling hydrocarbons to supply heat of conversion.

2. A process according to claim 1 wherein the mixture of contaminated catalyst and condensate oil forms a dry mixture.

3. A process of converting higher boiling hydrocarbons to lower boiling hydrocarbons which comprises, contacting higher boiling hydrocarbons with hot regenerated catalyst particles in a conversion zone wherein higher boiling hydrocarbons are converted to lower boiling hydrocarbons and carbonaceous material is deposited on the catalyst, passing vaporous products of conversion containing entrained catalyst particles overhead from said conversion zone to a fractionating zone wherein higher boiling hydrocarbons are condensed and entrained catalyst particles are scrubbed out of the vapors by condensate oil and lower boiling hydrocarbons pass overhead from said fractionating zone, withdrawing contaminated catalyst particles from said conversion zone, mixing at least a portion of the condensate oil with the withdrawn contaminated catalyst particles, passing the mixture to a regeneration zone wherein deposited carbonaceous material and condensate oil are burned to heat the catalyst particles and then mixing hot regenerated catalyst with higher boiling hydrocarbons to supply heat of conversion of the hydrocarbons.

EDWIN J. GOHR.

REFERENCES CITED

The following references are of record in the file of this patent:

UNITED STATES PATENTS

| Number | Name | Date |
| --- | --- | --- |
| 1,475,502 | Manning | Nov. 27, 1923 |
| 2,065,643 | Brandt | Dec. 29, 1936 |
| 2,128,220 | Cooke | Aug. 30, 1938 |
| 2,247,097 | Menshih | June 24, 1941 |
| 2,253,486 | Belchetz | Aug. 19, 1941 |
| 2,273,075 | Weems | Feb. 17, 1942 |
| 2,289,329 | Prickett | July 7, 1942 |
| 2,290,845 | Voorhees | July 21, 1942 |
| 2,303,047 | Hemminger | Nov. 24, 1942 |
| 2,305,569 | Degnen | Dec. 15, 1942 |
| 2,325,516 | Holt et al. | July 27, 1943 |
| 2,334,583 | Reeves | Nov. 16, 1943 |
| 2,367,281 | Johnson | Jan. 16, 1945 |